Patented May 9, 1944

2,348,613

UNITED STATES PATENT OFFICE 2,348,613

QUATERNARY AMMONIUM COMPOUND AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application October 20, 1941, Serial No. 415,766. Divided and this application June 3, 1943, Serial No. 489,573

6 Claims. (Cl. 260—287)

This invention relates to a new chemical compound.

One object of our invention is to provide a new material or composition of matter, that is particularly adapted for use as a demulsifier in the resolution of crude oil emulsions, and also capable of use for various other purposes. For instance, the material may be used as a break inducer in doctor treatment of the kind intended to sweeten gasoline. Certain of the compositions of matter herein described are of value as surface tension depressants in the acidification of calcareous oil-bearing strata by means of strong mineral acid, such as hydrochloric acid. Similarly, some members are effective as surface tension depressants, or wetting agents in the flooding of exhausted oil-bearing strata.

Another object of our invention is to provide a novel method for producing said new material or composition of matter.

The new composition of matter herein described consists of a quaternary compound of the pyridine series of the kind hereinafter described in detail. Members of the pyridine series suitable as reactants include pyridine, alkylated derivatives of pyridine, particularly alkylated derivatives, in which the alkyl radical contains three carbon atoms or less, and especially methylated pyridines, i. e., pyridines, in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

Specifically, then, the compounds herein contemplated as demulsifiers consist of the quaternary nitrogen products obtained by reacting one mole of hydroxy compounds (substituted lactamides containing at least one nitrogen-linked high molal hydrocarbon radical having at least 8 and not more than 32 carbon atoms), of the following formula:

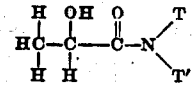

wherein T is a hydrocarbon radical having at least 8 and not more than 32 carbon atoms, and T" is a hydrogen atom, a hydrocarbon radical having less than 8 carbon atoms, or the same as T, with a heterocyclic compound of the pyridine series selected from the group consisting of pyridine, quinoline, isoquinoline, and C-methyl homologues thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

As to primary or secondary amines having at least 8 and not more than 32 carbon atoms, and which are suitable for reaction with lactic acid or its functional equivalent, for instance, ethyl lactate, reference is made to U. S. Patent No. 2,246,842, dated June 24, 1941, to De Groote. It is to be noted that that particular patent excludes arylamines; but it is understood that such compounds are not excluded in the present instance. For instance, naphthylamine, methyl naphthylamine, ethyl naphthylamine, and the like, may be employed.

Furthermore, attention is directed to the fact that said aforementioned De Groote patent contemplates, inter alia, certain tertiary amines. Such amines, of course, are not herein contemplated as reactants, insofar that there is no reactive hydrogen atom available.

The primary amines which may be used as such or converted into secondary amines by conventional processes, such as treatment with methyl iodide, benzyl chloride, alkyl sulphates, or the like, include the following: octadecenylamine; cetylamine; stearylamine; oleoamine; ricinoleoamine; amines derived from naphthenic acids; amines derived from octadecadiene 9,11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc. The amines may be aliphatic, aralkyl, alicyclic, aryl, alkyl, etc.

One may also employ amines derived from acids obtained by oxidation of wax, paraffin, etc. Such acids may have as many as 32 carbon atoms. For instance, see U. S. Patent No.

2,242,837, dated May 20, 1941, to Shields. The following patents listed in the aforementioned De Groote Patent No. 2,246,842, are herein included as a matter of convenience indicating means of obtaining such high molal primary or secondary amines or methods which can be obviously modified to produce the same:

|  | Dated | Patentee |
| --- | --- | --- |
| U. S. Patent No.: |  |  |
| 1,951,469 | Mar. 20, 1934 | Bertsch |
| 2,006,058 | June 25, 1935 | Olin |
| 2,033,866 | Mar. 10, 1936 | Schrauth |
| 2,074,380 | Mar. 23, 1937 | Flett |
| 2,078,922 | May 4, 1937 | Arnold |
| 2,091,105 | Aug. 24, 1937 | Pigott |
| 2,108,147 | Feb. 15, 1938 | Speer |
| 2,110,199 | Mar. 8, 1938 | Carothers |
| 2,132,902 | Oct. 11, 1938 | Lenher |
| 2,178,522 | Oct. 31, 1938 | Ralston |
| British Patent No.: |  |  |
| 359,001 | 1932 | Johnson |
| 358,114 | 1932 | Carpmael |

Having obtained a high molal amine of the kind described, it is reacted with lactic acid, or its functional equivalent, and most preferably, with a lactic acid ester, for instance, methyl lactate, ethyl lactate, propyl lactate, etc. Such reaction results in the formation of a substituted lactamide, as indicated by the following:

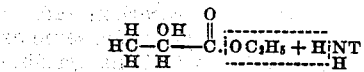

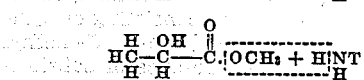

The substituted lactamides thus obtained are reacted with pyridine hydrochloride or a halide of any of the heterocyclic bases previously described, or mixtures thereof. Such reactions may be indicated in the following manner:

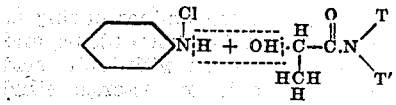

Our preferred reactants are: octadecyllactamide; cetyllactamide; stearyllactamide; hydroxydecyllactamide; octadecyllactamide; dodecyllactamide; octyllactamide; decyllactamide; heptadecyllactamide; or the comparable derivatives obtained from ricinoleic acid, oleic acid, or mixed fatty acids of the kind previously described. In some instances, of course, the hydrocarbon group actually has an oxygen atom present, as, for example, when derived from an amine, which, in turn, is obtained from ricinoleic acid as a raw material. This matter has also been referred to in the aforementioned De Groote Patent No. 2,246,842.

In any event, having obtained a suitable substituted lactamide of the kind described, it is reacted with pyridine hydrochloride, or the equivalent. The mechanical procedure employed is substantially the same as used in connection with another type of reaction involving the formation of quaternary compounds by the elimination of water. See U. S. Patent No. 2,242,211, dated May 20, 1941, to Haack. See also U. S. Patent No. 2,273,181, dated February 17, 1942, to De Groote and Keiser. The compounds or compositions of matter intended to be used as the demulsifier of our process may be exemplified by the following examples:

*Example 1*

One pound mole of octyllactamide (derived by reaction between octylamine and ethyl lactate) is reacted with 1.1 pound moles of pyridine hydrochloride in the presence of 1/20 of a mole of free pyridine. The reaction is conducted at approximately 150–160° C., until the substituted lactamide has been converted into the quaternary compound. This reaction is complete in a comparatively short time, in some instances, less than one hour, although in other instances three or four hours may be required. If desired, the reaction may be conducted at a slightly higher temperature, for instance, as high as 180° C. Instead of using pyridine hydrochloride, one may employ the hydrochloride of a fraction of pyridine bases of the kind that 50% will distil over at 140° C., or below, and 90%, at 160° C. or below. Such selected pyridine bases are of the kind which are entirely water-soluble.

*Example 2*

Octadecenyllactamide is substituted for octyllactamide in Example 1, preceding.

*Example 3*

Octadecyllactamide is substituted for octyllactamide in Example 1, preceding.

*Example 4*

Dodecyllactamide is substituted for octyllactamide in Example 1, preceding.

*Example 5*

Decyllactamide is substituted for octyllactamide in Example 1, preceding.

*Example 6*

The substituted lactamide derived by reaction between methyl lactate and ricinoleoamine is substituted for octyllactamide in Example 1, preceding.

*Example 7*

Nephthenic acids of the following characteristics:

| | |
| --- | --- |
| Unsaponifiable matter___per cent__ | 6.8 |
| Water by distillation_____do____ | 1.0 |
| Saponification number_____ | 229.0 |
| Neutralization number_____ | 223.0 to 228.0 |
| Ash _____per cent__ | 0.76 | are converted into amines in the conventional manner, and such naphthenylamine is reacted with ethyl lactate to obtain the corresponding substituted lactamide, instead of octyllactamide, in Example 1, preceding.

The manufacture of the above compounds is usually conducted with an excess of the pyridinium halide, such as the hydrochloride, or hydrobromide, and usually, in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Sometimes the reaction with the pyridinium compound can be catalyzed by the presence of small amounts of soaps or alkalies. As is obvious, other monovalent anions may replace the halogen and serve as a functional equivalent.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

It has been pointed out that the present invention is concerned not only with chemical compounds for breaking petroleum emulsions of the water-in-oil type in various forms, as already described; but the present invention is also concerned with a method of preparing the same. Such new compounds are of utility, not only for the purposes specifically enumerated in detail, but also find application in various industries, processes, and for various uses where wetting agents of the conventional type are used. As to some of such uses which are well known, see "The expanding application of wetting agents," Chemical Industries, volume 48, page 324 (1941).

Attention is directed to U. S. Patent No. 2,273,181, dated February 17, 1942, to De Groote and Keiser. Said patent contemplates resolution of petroleum emulsions of the water-in-oil type by means of demulsifiers of the following formula type:

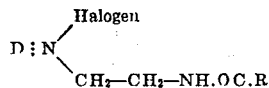

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologues thereof. The halogen, of course, is most suitably chlorine or bromine; but iodine may be employed except for its excessive cost. More correctly, D:N is contemplated as a radical, rather than a compound.

Attention is also directed to our copending applications, filed the same date as the instant application, and bearing the following serial numbers: 415,763, 415,764 and 415,765.

The present application is a division of our pending application Serial No. 415,766, filed Oct. 20, 1941.

Having thus described our invention, what we claim as new and desire to secure by Letters Patent is:

1. A new chemical compound of the following formula:

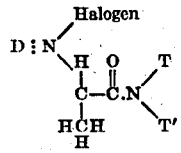

wherein T is a hydrocarbon radical having at least 8 and not more than 32 carbon atoms, and T' is a member of the class consisting of hydrogen atoms and hydrocarbon radicals having not more than 32 carbon atoms; and D:N represents a heterocyclic compound of the pyridine series consisting of pyridine, quinoline, isoquinoline, and C-linked methyl homologues thereof.

2. A new chemical compound of the following formula:

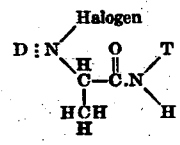

wherein T is a hydrocarbon radical having at least 8 and not more than 32 carbon atoms; and D:N represents a heterocyclic compound of the pyridine series consisting of pyridine, quinoline, isoquinoline, and C-linked methyl homologues thereof.

3. A new chemical compound of the following formula:

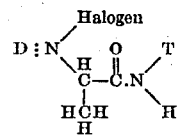

wherein T is an alkyl radical having at least 8 and not more than 32 carbon atoms; and D:N represents a heterocyclic compound of the pyridine series consisting of pyridine, quinoline, isoquinoline, and C-linked methyl homologues thereof.

4. A new chemical compound of the following formula:

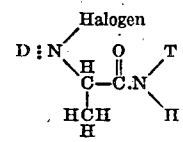

wherein T is an alicyclic radical having at least 8 and not more than 32 carbon atoms; and D:N represents a heterocyclic compound of the pyridine series consisting of pyridine, quinoline, isoquinoline, and C-linked methyl homologues thereof.

5. A new chemical compound of the following formula:

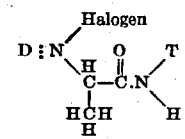

wherein T is an aryl radical having at least 8 and not more than 32 carbon atoms; and D:N represents a heterocyclic compound of the pyridine series consisting of pyridine, quinoline, isoquinoline, and C-linked methyl homologues thereof.

6. A method for manufacturing chemical compounds of the following formula type:

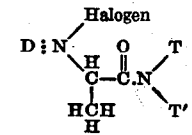

wherein T is a hydrocarbon radical having at least 8 and not more than 32 carbon atoms, and T' is a member of the class consisting of hydrogen atoms and hydrocarbon radicals having not more than 32 carbon atoms; and D:N represents a heterocyclic compound of the pyridine series consisting of pyridine, quinoline, isoquinoline, and C-linked methyl homologues thereof; said method involving the step of reacting a substituted lactamide of the following type:

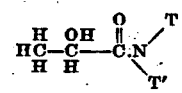

in which T and T' have their prior significance, with a hydrohalide of a heterocyclic compound of the pyridine series to supply the radical

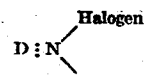

MELVIN DE GROOTE.
BERNHARD KEISER.